(No Model.)
W. H. McCORMICK.
COMBINATION RAILWAY RAIL AND JOINT.
No. 517,551. Patented Apr. 3, 1894.
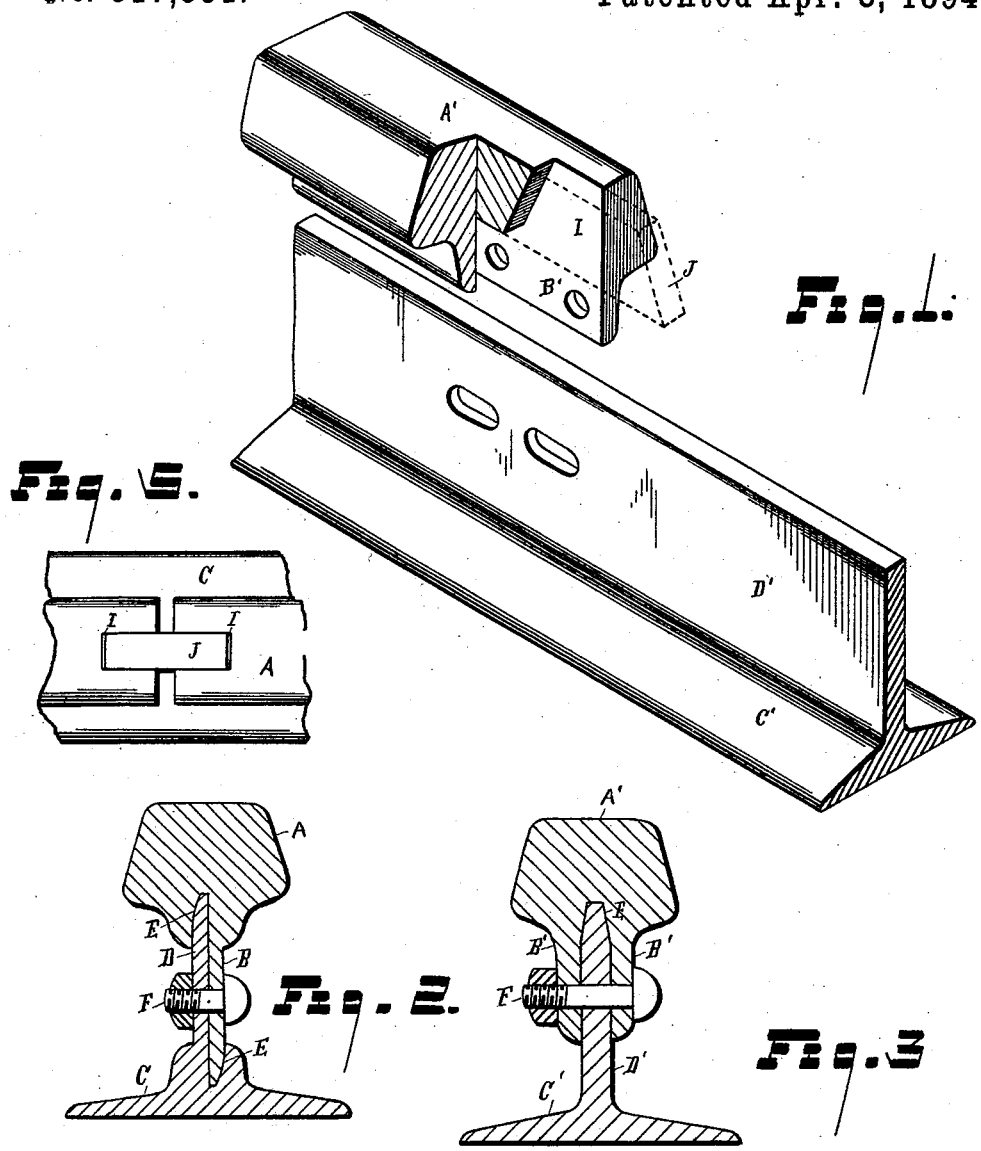
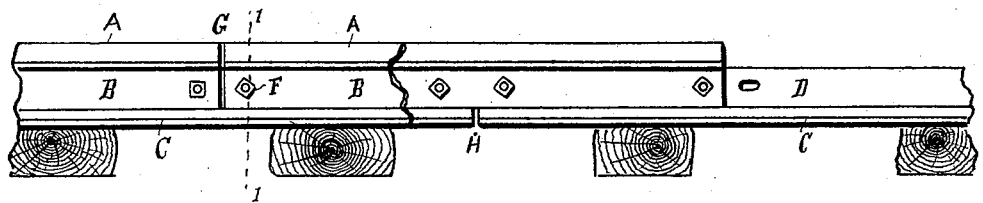
WITNESSES
Newton G. Leslie
Levi F. Cox
INVENTOR
William H. McCormick.
By Lucius C. West.
atty.

UNITED STATES PATENT OFFICE.

WILLIAM H. McCORMICK, OF KALAMAZOO, MICHIGAN, ASSIGNOR OF ONE-HALF TO HENRY A. KINNIE, OF SAME PLACE.

COMBINATION RAILWAY RAIL AND JOINT.

SPECIFICATION forming part of Letters Patent No. 517,551, dated April 3, 1894.

Application filed May 26, 1893. Serial No. 475,549. (No model.)

*To all whom it may concern:*

Be it known that I, WILLIAM H. McCOR-MICK, a citizen of the United States, residing at Kalamazoo, county of Kalamazoo, State of Michigan, have invented a new and useful Railway-Rail, of which the following is a specification.

This invention relates to rails composed of separate tread and base parts bolted together to form a complete rail, and it has for its object a construction and combination of elements designed to add to the solidity and utility of such rails.

In the drawings forming a part of this specification, Figure 1 is an enlarged perspective of the tread part and base part of a rail, separated, ready to be put together. Fig. 2 is a cross section, enlarged, on line 1—1, in Fig. 4, looking from a point at the right; Fig. 3 the same, showing a change in the construction; Fig. 4 a broken side elevation of Fig. 2, looking from a point at the left; and Fig. 5 is a broken plan view, showing two contiguous separated ends of the tread parts of the rails.

Referring to the lettered parts of the drawings, A, in Figs. 2, 4 and 5, illustrates one form of the tread part of the rails, consisting of a tread part proper, provided with an integral pendent web, B, representing one half of that portion of the rail which is between the tread part and base part. The base part, C, which rests on the ties, is provided with an upwardly extending integral web, D, which forms the other half of that portion of the rail which is between the tread part A and the base C. These integral webs B and D, are made tapering toward their ends, in wedge shape, and the tread part A and base part C are provided with tapered grooves or channels, E, at the side of the webs opposite to each other and extending into said tread part and base part, as in Fig. 2, to receive said webs in a wedging manner when the tread part and base part are put together. When the parts are thus put together, as in Figs. 2 and 4, the webs B and D lap onto each other and are bolted together by bolts, F.

By referring to Fig. 4 it will be seen that the contiguous ends of the tread parts, A, of the rails, as at G, come between the ends of a base-part, C, of the rail, so that there is no separation of the base part at the point where the separation between the ends of the tread parts comes; and that the separation between the contiguous ends of the base part C, as at H, comes between the ends of a tread-part, so that there is no separation of the tread part where the separation between the ends of the base parts comes; thus the joints between the respective tread and base parts alternate with each other in regular succession throughout the length of the track, making the rail strong and continuous and dispensing with fish-plates and joint-bars.

Should the tread parts, A, of the rails, become unduly worn and need replacing, by removing the bolts, F, said tread part can be readily replaced with a new one, since the bolt holes are made in the same relative positions and equi-distant in all the tread parts and base parts, and hence will all fit. Of course the bolt holes are made oblong, to provide for contraction and expansion, in the ordinary manner of making rails.

The contiguous ends of the tread parts of the rail are mortised in, as at I, Figs. 1 and 5 into which are inserted the ends of the tongue, J, to hold the separated ends of the tread parts, A, steadier against lateral strain, and also to bridge over the joint, giving a continuous, unbroken surface to the tread of the car wheel.

The mortises, I, in the ends of the tread-parts of the rails, communicate with the channels in the under side of said tread-parts, so that when the tread-parts and base-parts are attached together the tongue will rest upon the upper edges of the webs of the base-parts of the rails; the dotted position of the tongue in Fig. 1 showing that such would be the case when the tread and base parts were attached together. Thus the tongue has a firm foundation and is ever held up flush with the tops of the tread-parts of the rails.

The ends of the mortises, I, and tongues, J, are formed on a bevel, diverging outward, which prevents any jar from tossing the tongues upward and out of the mortises. If preferred, however, the tongue J may be made integral with the end of one of the tread parts, A, and be detachably inserted into a mortise in the contiguous end of the tread part of the other rail.

In Figs. 1 and 3, the tread part, A', of the rail, is provided with two integral pendent webs, B', with the groove or channel, E, central between them, and the base part C' has an upwardly extending projecting web, D', which fits into the channel E, when the tread part and base part are bolted together, as in Fig. 3. This shows a change in the construction from that previously described, which if preferred may be adopted.

The upwardly projecting web, D', and channel, E, are preferably made tapered, as in Fig. 3, but may be made straight, as in Fig. 1.

When the webs D, B and D' and the channel E, are made tapering, so as to be detachably fitted together in a wedging manner, the tread part and base part are more firmly held together.

Having thus described my invention, what I claim as new, and desire to secure by Letters Patent of the United States, is—

The combination of the tread-parts and base-parts provided with their webs and channels and detachably bolted together, the joints between the ends of the tread-parts alternating with the joints between the ends of the base-parts, the contiguous ends of said tread-parts being provided with the open mortises communicating with the channels of said tread-parts, and the tongues in said mortises resting upon the webs of the base-parts; substantially as set forth.

In testimony to the foregoing I have hereunto subscribed my name in the presence of two witnesses.

WILLIAM H. McCORMICK.

Witnesses:
N. G. LESLIE,
ALBERT DOLL.